Nov. 16, 1954 P. H. MILLER ET AL 2,694,258
STYLUS MECHANISM
Filed March 5, 1946

INVENTOR.
PHILIP H. MILLER
LEOPOLD E. ROVNER
BY
*M. O. Hayes*
ATTORNEY

United States Patent Office 2,694,258
Patented Nov. 16, 1954

2,694,258
STYLUS MECHANISM

Philip H. Miller, Tuxedo Park, N. Y., and Leopold E. Rovner, Iowa City, Iowa, assignors, by mesne assignments, to the United States of America as represented by the Secretary of the Navy Application March 5, 1946, Serial No. 652,198

11 Claims. (Cl. 33—27)

This invention relates to geometrical curve-producing instruments and more particularly to a stylus mechanism for such instruments.

In an instrument for drawing families of plane confocal hyperbolas such as is disclosed in the copending application of Leopold E. Rovner for a Hyperbolograph Instrument, Serial Number 639,897, filed January 8, 1946, a dragging stylus unit is pulled in toward the base line under tension of two cords issuing as from the focal points. Since the condition of equal tension in the two cords is necessary for the proper functioning of the instrument, a stylus unit is required which will seek an equilibrium position such that this condition is continuously maintained.

The principal object of this invention is to provide a stylus mechanism for hyperbolograph instruments.

Another object of this invention is to provide a stylus mechanism which will continuously seek an equilibrium position such that equal tension in the two driving cords of a hyperbolograph instrument is maintained.

A further object of this invention is to provide a stylus mechanism in which a swivel arm carries a ball bearing mounted weight to increase the drag of the unit as it is pulled along a horizontal surface.

Other and further objects will appear during the course of the following description when taken with the accompanying drawings, in which.

Figure 1:
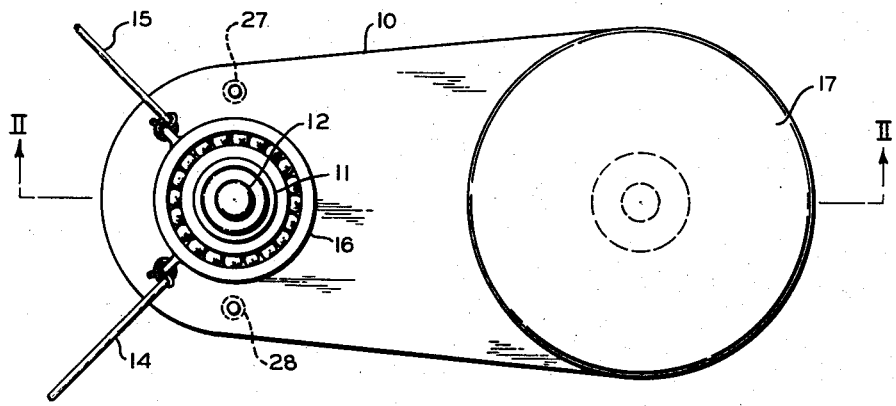
Fig. 1 is a top view of one embodiment of this invention.

In Fig. 1, a swivel arm 10 is drilled and threaded near one end to receive a sleeve-like holder 11, in which there is inserted a conventional stylus 12 whose point 13 (Fig. 2) traces the path of the unit as it is pulled along on the horizontal surface on which the curve is being drawn. As shown, cords 14 and 15 of the hyperbolograph instrument are secured to holder 11 by being passed through the eyelets on ball bearings 16 and tied, these ball bearings being coaxially mounted on holder 11. Alternatively, cords 14 and 15 may be secured to holder 11 by tension gauge rings such as are disclosed in the copending application of Carl K. Hansen, Philip H. Miller and Leopold E. Rovner for a Cord Tension Indicator, Serial Number 645,623, filed February 5, 1946. At the other end of swivel arm 10 is a cylindrical weight 17 of a suitable heavy material, such as lead, which increases the drag of the unit. Swivel arm 10, acting between the cords and the weight, serves, over a limited range, to swing so that equal tension is maintained in the cords as the stylus unit is pulled toward the base line while drawing the curve. It permits the stylus point to return to true equilibrium position despite small displacements accidentally produced during its motion.

Figure 2:
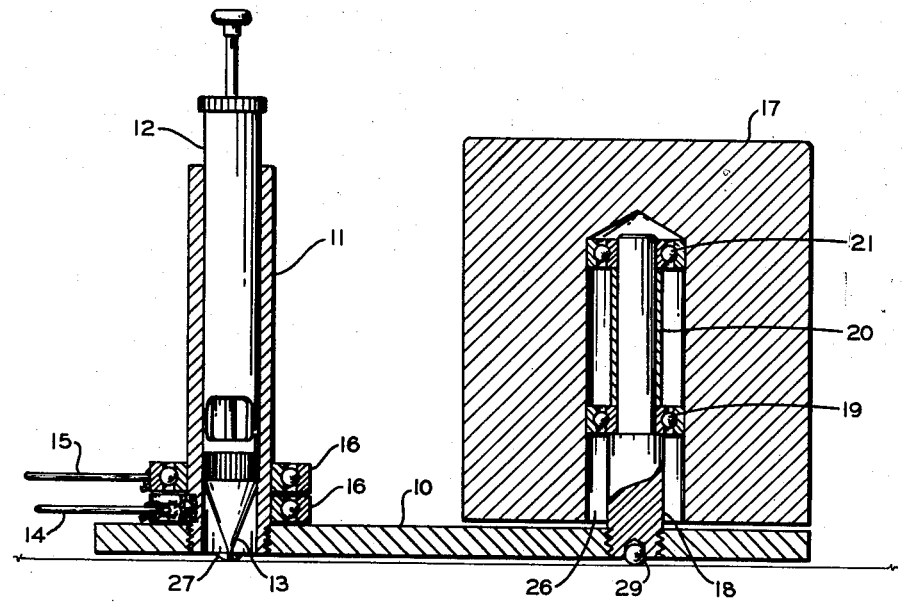
Fig. 2 is a generally cross sectional view taken along line II—II of Fig. 1.

Referring now to Fig. 2, swivel arm 10 is drilled and threaded near the end opposite from that containing holder 11 to receive a circular post or rod 18. Rod 18 has a reduced diameter upper section to produce a shoulder, which shoulder supports ball bearing 19 mounted coaxially about rod 18. A sleeve 20 fitted over the reduced diameter section of rod 18 above bearing 19 positions a second ball bearing 21 which is also mounted coaxially about rod 18. A hole 26 is drilled axially up from the bottom of weight 17, and hence it appears in the figure as an inverted cup. Weight 17 is mounted coaxially about rod 18 and is positioned and supported by ball bearings 19 and 21 as shown so that it is free to rotate about the axis of rod 18. This ball bearing method of mounting weight 17 allows swivel arm 10 to go through small motions independent of the heavy mass which rides free above it, on the bearings and in this way reduces the moment of inertia of the stylus axis about the center-of-drag axis, thus facilitating small, fast, swivel motions of the light swivel arm 10. Two rivets 27 and 28, which are mounted on the under surface of swivel arm 10 adjacent stylus point 13 have hardened and polished heads. A hole is drilled axially up from the bottom of rod 18 and a hardened steel ball 29 is pressed into this hole. The whole unit rests on a horizontal surface on three points formed by rivets 27 and 28 and steel ball 29. Alternatively, the unit may be provided with drag pads such as are disclosed in the copending application of Carl K. Hansen and Leopold E. Rovner for a stylus-base mechanism, Serial Number 656,028, filed March 21, 1946.

This invention is only to be limited by the appended claims.

What is claimed is:

1. A stylus mechanism for a curve-producing instrument comprising, a swivel arm, a stylus mounted at a first end of said swivel arm, a weight mounted at the other end of said swivel arm, and means for attaching driving filaments to said swivel arm, said attaching means being rotatably secured to said first end of said swivel arm.

2. A stylus mechanism for a curve-producing instrument comprising a swivel arm, said swivel arm being formed with a plurality of projections adapted to support said swivel arm above a flat surface, a stylus mounted at a first end of said swivel arm, a weight mounted at the other end of said swivel arm, and means for attaching driving filaments to said swivel arm, said attaching means being rotatably secured to said first end of said swivel arm.

3. A stylus mechanism as in claim 2 wherein one of said projections is disposed beneath said weight.

4. A stylus mechanism for a curve-producing instrument comprising a swivel arm, said swivel arm being formed with a plurality of means projecting therefrom, said means being adapted to support said swivel arm above a supporting surface, a stylus mounted at a first end of said swivel arm, a weight rotatably mounted at the other end of said swivel arm, one of said projecting means being located on the rotational axis of said weight and means for attaching driving filaments to said swivel arm, said attaching means being rotatably secured to said first end of said swivel arm.

5. A stylus mechanism for a curve-producing instrument comprising, a swivel arm, said swivel arm being provided with a plurality of supporting means projecting therefrom, said supporting means being adapted to support said swivel arm above a supporting surface, a stylus mounted at a first end of said swivel arm, a weight rotatably mounted at the other end of said swivel arm, one of said supporting means being located on the pivotal axis of said weight and means for attaching driving filaments to said swivel arm, said attaching means being rotatably secured to said first end of said swivel arm, the axis of rotation of said attaching means being coincident with the position of said stylus.

6. A stylus mechanism for a curve-producing instrument adapted to be moved over a horizontal supporting surface comprising, a swivel arm, said swivel arm being provided with a plurality of supporting means projecting therefrom, said supporting means being adapted to support said swivel arm above said supporting surface, a stylus mounted at a first end of said swivel arm, a weight rotatably mounted at a second end of said swivel arm, the mounting means for said weight permitting substantially frictionless rotation of said weight about a vertical axis, and means for attaching driving filaments to said swivel arm, said attaching means being rotatably secured to said first end of said swivel arm, the axis of rotation of said attaching means being coincident with the position of said stylus.

7. A stylus mechanism for a curve-producing instrument including a horizontal surface for supporting said stylus mechanism, said stylus mechanism comprising, a swivel arm, said swivel arm being provided with three supporting means projecting therefrom, said supporting means being arranged in a triangle with two of said supporting means at a first end of said swivel arm and one of said supporting means at a second end of said swivel arm, said supporting means being adapted to support said swivel arm above said supporting surface, a stylus mounted at said first end of said swivel arm, a weight rotatably mounted at said second end of said swivel arm, the mounting means for said weight permitting substantially frictionless rotation of said weight about a vertical axis, and means for attaching driving filaments to said swivel arm, said attaching means being rotatably secured to said first end of said swivel arm, the axis of rotation of said attaching means being parallel to the rotational axis of said weight.

8. A stylus mechanism for a curve-producing instrument including a horizontal surface for supporting said stylus mechanism, said stylus mechanism comprising, a swivel arm, said swivel arm being provided with three supporting means projecting therefrom, said supporting means being arranged at the vertices of an isosceles triangle with two of said supporting means at a first end of said swivel arm and one of said supporting means at a second end of said swivel arm, said supporting means being adapted to support said swivel arm above said supporting surface, a stylus mounted at said first end of said swivel arm intermediate said two supporting means, a weight rotatably mounted at said second end of said swivel arm, the mounting means for said weight permitting substantially frictionless rotation of said weight about a vertical axis passing through said one supporting means, and means for attaching driving filaments to said swivel arm, said attaching means being rotatably secured to said first end of said swivel arm, the axis of rotation of said attaching means passing through the location of said stylus parallel to the rotational axis of said weight.

9. A sylus mechanism for a curve-producing instrument including a horizontal surface for supporting said stylus mechanism, said stylus mechanism comprising, a swivel arm, said swivel arm being provided with three supporting means projecting therefrom, said supporting means being arranged at the vertices of an isosceles triangle with two of said supporting means at a first end of said swivel arm and one of said supporting means at a second end of said swivel arm, said supporting means being adapted to support said swivel arm above said supporting surface, a stylus mounted at said first end of said swivel arm intermediate said two supporting means, a bearing post extending vertically upward from said swivel arm, a weight, substantially frictionless bearing means rotatably supporting said weight on said bearing post, the axis of rotation of said weight being vertical and coincident with said one supporting means, and means for attaching driving filaments to said swivel arm, said attaching means being rotatably secured to said first end of said swivel arm, the axis of rotation of said attaching means passing through the location of said stylus in a direction parallel to the rotational axis of said weight.

10. A stylus mechanism for a geometrical curve-producing instrument comprising a swivel plate, a plurality of gliders secured to a first surface of said swivel plate, said gliders being arranged at the vertices of an isosceles triangle, a cylindrical stylus holder extending perpendicularly from a second surface of said swivel plate at a point substantially at the midpoint of the base of said triangle, first and second spaced ball bearing members having their inner races fitted about said stylus holder, the outer races of each of said first and second ball bearing members being formed with means for attaching a driving filament thereto, a bearing post extending perpendicularly from said second surface of said swivel plate, a weight, substantially frictionless bearing members supporting said weight on said bearing post, said last-mentioned bearing members permitting said weight to rotate about an axis perpendicular to said swivel plate.

11. A stylus mechanism as in claim 10 wherein said bearing members supporting said weight include at least one ball bearing member having its inner race fitted about said bearing post and its outer race fitted in an opening in said weight.

References Cited in the file of this patent

UNITED STATES PATENTS

| Number | Name | Date |
|---|---|---|
| 2,385,827 | McKaba | Oct. 2, 1945 |